(12) United States Patent
Chen

(10) Patent No.: US 9,091,357 B2
(45) Date of Patent: Jul. 28, 2015

(54) CERAMIC VALVE WITH INTERMEDIATE SECTION HAVING COLD WATER SUPPLY FUNCTION

(71) Applicant: Mei-Li Chen, Tanzih Township, Taichung County (TW)

(72) Inventor: Mei-Li Chen, Tanzih Township, Taichung County (TW)

(73) Assignee: KUCHING INTERNATIONAL LTD., Tanzih Township, Taichung County (TW)

( * ) Notice: Subject to any disclaimer, the term of this patent is extended or adjusted under 35 U.S.C. 154(b) by 67 days.

(21) Appl. No.: 14/107,486

(22) Filed: Dec. 16, 2013

(65) Prior Publication Data

US 2015/0167854 A1 Jun. 18, 2015

(51) Int. Cl.
*F16K 11/078* (2006.01)
*E03C 1/04* (2006.01)

(52) U.S. Cl.
CPC .............. *F16K 11/0782* (2013.01); *E03C 1/04* (2013.01); *F16K 11/0785* (2013.01)

(58) Field of Classification Search
CPC .. F16K 11/0782; F16K 11/0785; E03C 1/041
USPC ............................. 137/625.17, 625.4, 625.41
See application file for complete search history.

(56) References Cited

U.S. PATENT DOCUMENTS

| 3,533,436 | A | * | 10/1970 | Parkison | 137/359 |
| 4,540,023 | A | * | 9/1985 | Pawelzik | 137/625.17 |
| 4,657,045 | A | * | 4/1987 | Kitamura | 137/625.4 |
| 6,390,128 | B1 | * | 5/2002 | Tung | 137/625.17 |
| 6,966,335 | B2 | * | 11/2005 | Chen | 137/625.17 |
| 7,032,272 | B2 | * | 4/2006 | Haenlein | 16/366 |
| 7,213,614 | B2 | * | 5/2007 | Chen | 137/625.4 |
| 7,861,742 | B2 | * | 1/2011 | Kim | 137/625.4 |
| 8,631,823 | B2 | * | 1/2014 | Heerklotz | 137/625.4 |

* cited by examiner

*Primary Examiner* — John Fox
(74) *Attorney, Agent, or Firm* — Egbert Law Offices, PLLC

(57) ABSTRACT

A ceramic valve with an intermediate section having cold water supply function, which comprising: a valve casing, rotary driving seat, braking valve rod, pedestal, fixed valve block, rotary valve block and coupling seat; of which the coupling seat is assembled securely on top surface of the rotary valve block; it is characterized by that: a driven slot, recessed into an off-center position on top surface of the coupling seat; the toggle end at lower end of the braking valve rod is inserted into said driven slot, and there is an active clearance between the driven slot and toggle end; a biased rotary support unit, comprising of a flanged axle and an axle hole that are sleeved together in a rotatable state; said flanged axle and axle hole are separately arranged at top surface of the coupling seat and an off-center position on bottom surface of the inner seating portion of the rotary driving seat; hence, a biased rotary support position is shaped between the rotary driving seat and coupling seat; when the braking valve rod swings to an oblique water supply mode from the preset intermediate section, the toggle end at lower end of the braking valve rod will linearly toggle the driven slot, then the coupling seat along with the rotary valve block may rotarily shift by taking the biased rotary support unit as a rotary pivotal point, so the water flow control slot is only connected with the cold water through-hole in a cold water supply mode. Hence, the cold water supply function of the ceramic valve's intermediate section could prevent scalding and meet the resetting habit of the user for the handle of the dual-temperature faucet with improved applicability.

2 Claims, 7 Drawing Sheets

CERAMIC VALVE WITH INTERMEDIATE SECTION HAVING COLD WATER SUPPLY FUNCTION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a ceramic valve, and more particularly to an innovative one which is designed with an intermediate section having cold water supply functions.

2. Description of Related Art Including Information Disclosed Under 37 CFR 1.97 and 37 CFR 1.98.

Recently, the operational safety of a cold/hot water faucet (hereinafter referred to as a dual-temperature faucet), especially its anti-scalding function, is of great concern in the industry. For this reason, multiple dual-temperature faucets with anti-scalding functions have been developed. For example, a retaining structure is set on the switching path, so the user has to apply a greater force when switching to a hot water mode.

In view of currently available dual-temperature faucet, if the user pulls up the handle already set on the intermediate section, the preset water supply is in a mixed state, rather than in a cold water state. However, some shortcomings are still observed from the structural design of such a dual-temperature faucet. If cold water supply state is required when the handle of the dual-temperature faucet is pulled up, the user may firstly turn the handle to the ready position for cold water and then pull up the handle properly. Yet, due attentions shall be paid to more scalding possibilities in anti-scalding design. Assuming that the handle is pulled up unintentionally or unwittingly by the users (e.g. children or the elderly) from the intermediate section, a mixed water state would be expected, but in fact there exist some unstable factors, for example, when water supply pressure at the cold water end is weak, this permits direct switching to hot water mode, leading to scalding hazards. Besides, the swinging angles of warm/hot water modes for the dual-temperature faucet differ very little, this will turn to hot water mode once the user slightly shifts or impinges on it. On the other hand, when the user pulls up the handle from the intermediate section, since the cold/hot water inlets are partially open, insufficient water pressure makes it impossible to ignite gas for hot water, leading possibly to gas leakage.

Furthermore, when the handle of conventional dual-temperature faucet is reset, the user could also reset it to the ready position for cold water, and then pulls up directly for a cold water supply state. To realize the balance of aesthetic effects, most of the users often reset the handle to the middle position after closing the faucet, especially in hotels and guesthouses where quality of service and customer satisfaction are of top priority. Hence, a feasible solution against the aforementioned problems is how to improve the design of the inner ceramic valve structure of a dual-temperature faucet.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the unique structure and technical characteristics of the present invention wherein "the ceramic valve with an intermediate section having cold water supply function" allows the driven slot to be set into an off-center position on top surface of the coupling seat, and there is an active clearance between the driven slot and toggle end. Then, a coupling seat and a biased rotary support unit arranged at an off-center position on the inner seating portion of the rotary driving seat are incorporated, so a biased rotary support position is shaped between the rotary driving seat and coupling seat. When the braking valve rod swings to an oblique water supply mode from the preset intermediate section, the toggle end of the braking valve rod will linearly toggle the driven slot, then the coupling seat along with the rotary valve block may rotarily shift by taking the biased rotary support unit as a rotary pivotal point, so the water flow control slot is only connected with the cold water through-hole in a cold water supply mode. Hence, the cold water supply function of the ceramic valve's intermediate section could prevent scalding and meet the resetting habit of the user for the handle of the dual-temperature faucet with improved applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
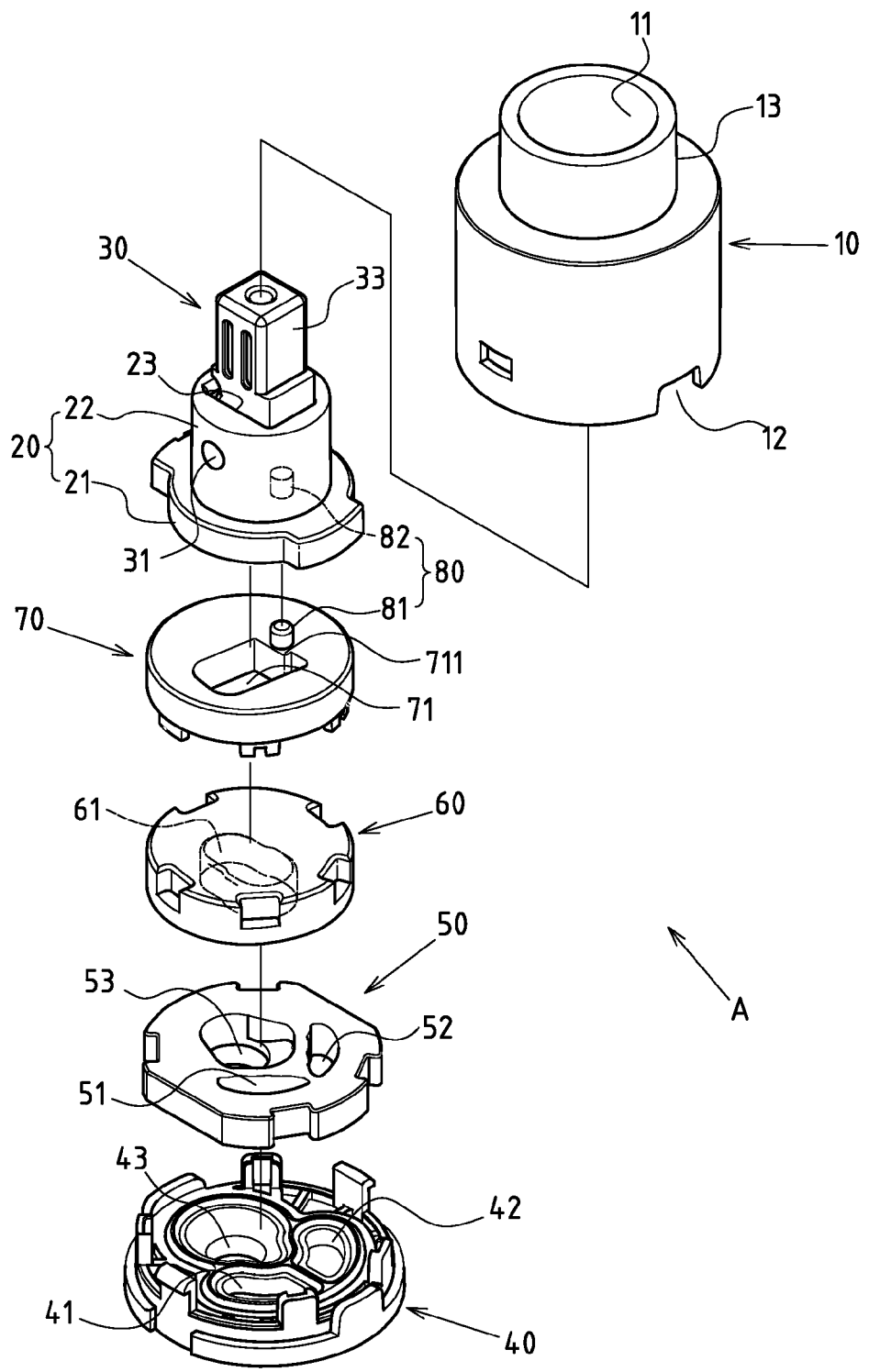
FIG. 1 is an exploded perspective view of the preferred embodiment of the present invention.
Figure 2:
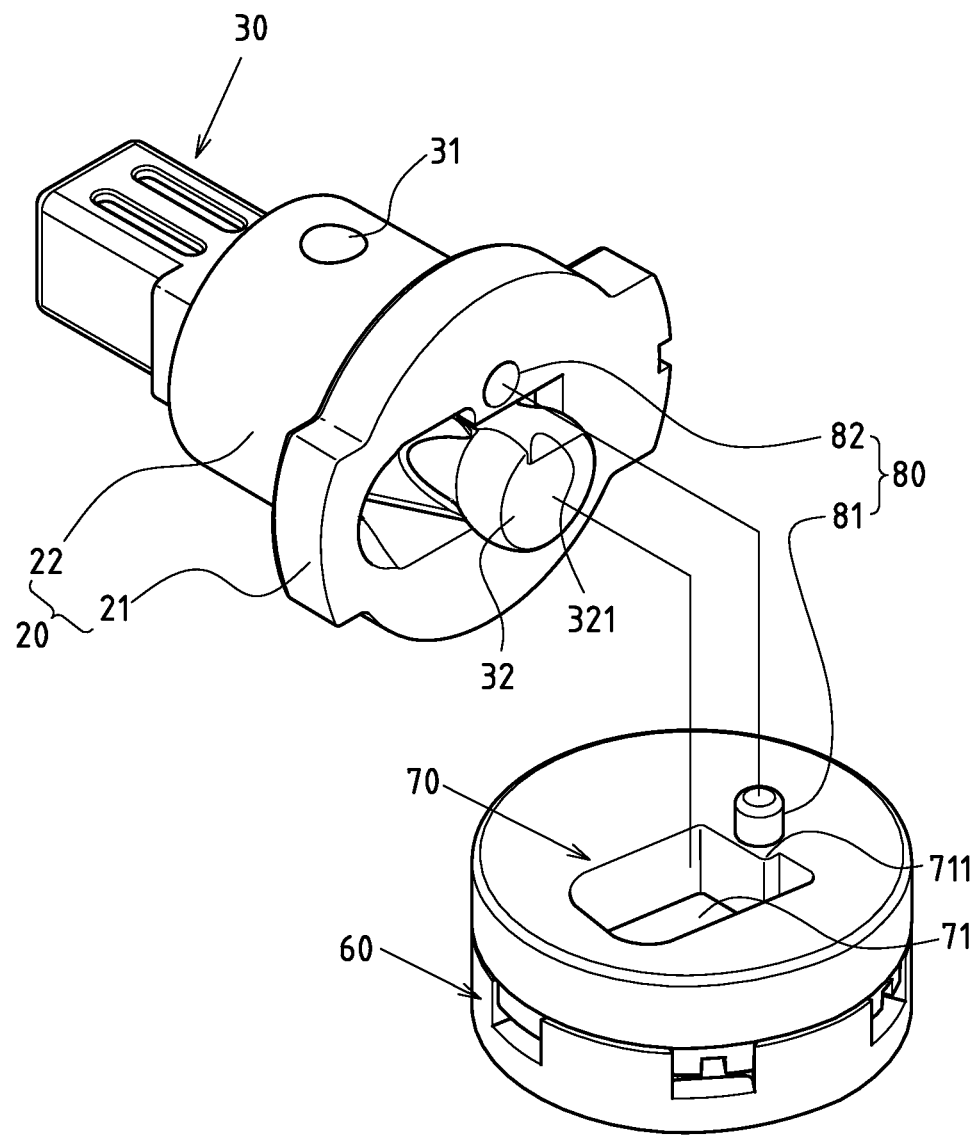
FIG. 2 is an exploded perspective view of present invention showing the relationship of partial components.

FIGS. 1-6 depict preferred embodiments of a ceramic valve of the present invention with an intermediate section having cold water supply function, which, however, are provided for only explanatory objective for patent claims.

Said ceramic valve A comprises a valve casing 10 with a hollow cylindrical shape, comprising of a top opening 11 and a bottom opening 12. The top opening 11 is provided with a reducing annular frame 13.

A rotary driving seat 20 comprises of an inner seating portion 21 and a flanged tubing portion 22 in a reducing pattern. Of which, the inner seating portion 21 is set adjacent to one end of the top opening 11 within the valve casing 10, the flanged tubing portion 22 is pivoted across the reducing annular frame 13 of the valve casing 10 in a rotatable state, and a through-type valve rod retaining hole 23 is set at center of the rotary driving seat 20.

A braking valve rod 30 is set into the valve rod retaining hole 23 of the rotary driving seat 20 via a rotary support 31 in a vertically rotary state. A toggle end 32 at lower end of the braking valve rod 30 is protruded below the inner seating portion 21 of the rotary driving seat 20, while a handle driving portion 33 at upper end of the braking valve rod 30 is protruded out of the flanged tubing portion 22 of the rotary driving seat 20.

A pedestal 40 is assembled securely into the bottom opening 12 of the valve casing 10. Said pedestal 40 comprises of a cold water inlet 41, a hot water inlet 42 and a water outlet 43 in a triangular configuration pattern;

A fixed valve block 50 is assembled securely onto the top surface of the pedestal 40, and comprises of a cold water through-hole 51, a hot water through-hole 52 and a discharge through-hole 53 in a triangular configuration pattern, which are aligned and connected correspondingly with the cold water inlet 41, hot water inlet 42 and water outlet 43 of the pedestal 40.

A rotary valve block 60 is superimposed on the top surface of the fixed valve block 50 in a rotary state. A recessed water flow control slot 61 is set on the bottom surface of the rotary valve block 60. Said water flow control slot 61 could vary with the rotary shift of the rotary valve block 60, so that different channels are generated correspondingly in relation to the cold water through-hole 51, hot water through-hole 52 and discharge through-hole 53 of the fixed valve block 50.

A coupling seat 70 is assembled securely on top surface of the rotary valve block 60 in a coupled state. A driven slot 71 is recessed into an off-center position on top surface of the coupling seat 70. The toggle end 32 at lower end of the braking valve rod 30 is inserted into said driven slot 71, and there is an active clearance between the driven slot 71 and toggle end 32.

A biased rotary support unit 80 comprises of a flanged axle 81 and an axle hole 8 that are sleeved together in a rotatable state. Said flanged axle 81 and axle hole 82 are separately arranged at top surface of the coupling seat 70 and an off-center position on bottom surface of the inner seating portion 21 of the rotary driving seat 20. Hence, a biased rotary support position is shaped between the rotary driving seat 20 and coupling seat 70. When the braking valve rod 30 swings to an oblique water supply mode from the preset intermediate section, the toggle end 32 at lower end of the braking valve rod 30 will linearly toggle the driven slot 71, then the coupling seat 70 along with the rotary valve block 60 may rotarily shift by taking the biased rotary support unit 80 as a rotary pivotal point, so the water flow control slot 61 is only connected with the cold water through-hole 51 in a cold water supply mode.

Of which, an angular concave surface 321 is set at one side of the toggle end 32 below the braking valve rod 30, while an angular flange 711 is set correspondingly to one side of the driven slot 71 on top surface of the coupling seat 70, enabling interlocking with the angular concave surface 321.

Figure 3:
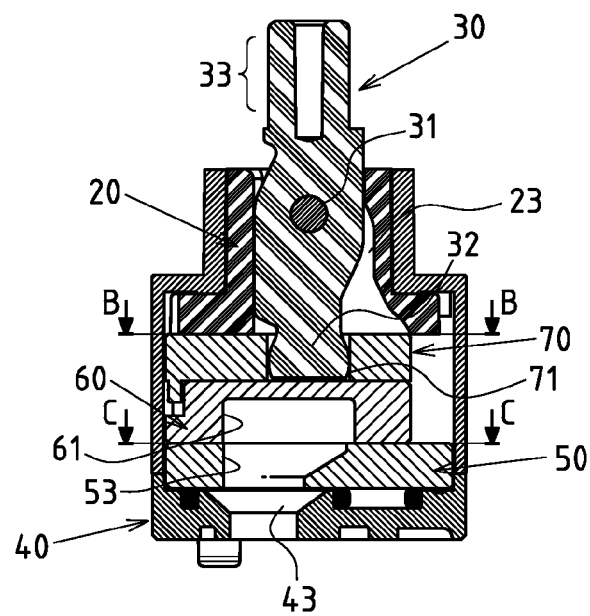
FIG. 3 is a vertical assembly sectional view of the present invention when the braking valve rod is located at the preset intermediate section in a vertical water-stop mode.
Figure 4:
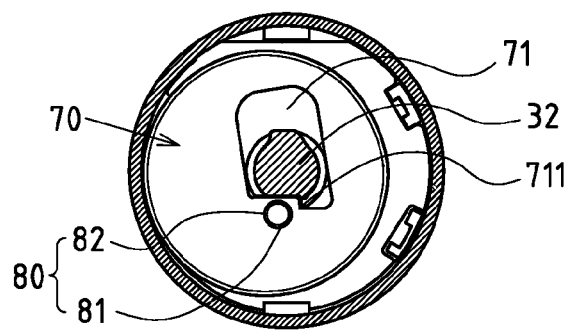
FIG. 4 shows a B-B sectional view of FIG. 3.
Figure 5:
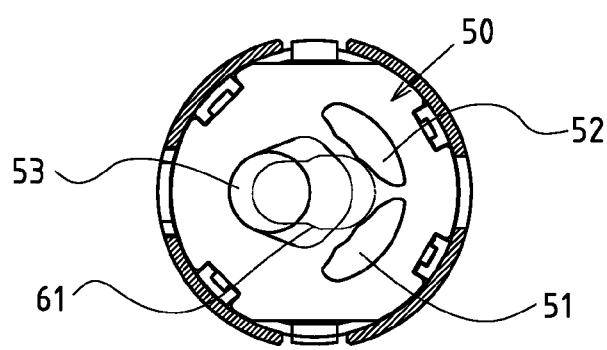
FIG. 5 shows a C-C sectional view of FIG. 3.
Figure 6:
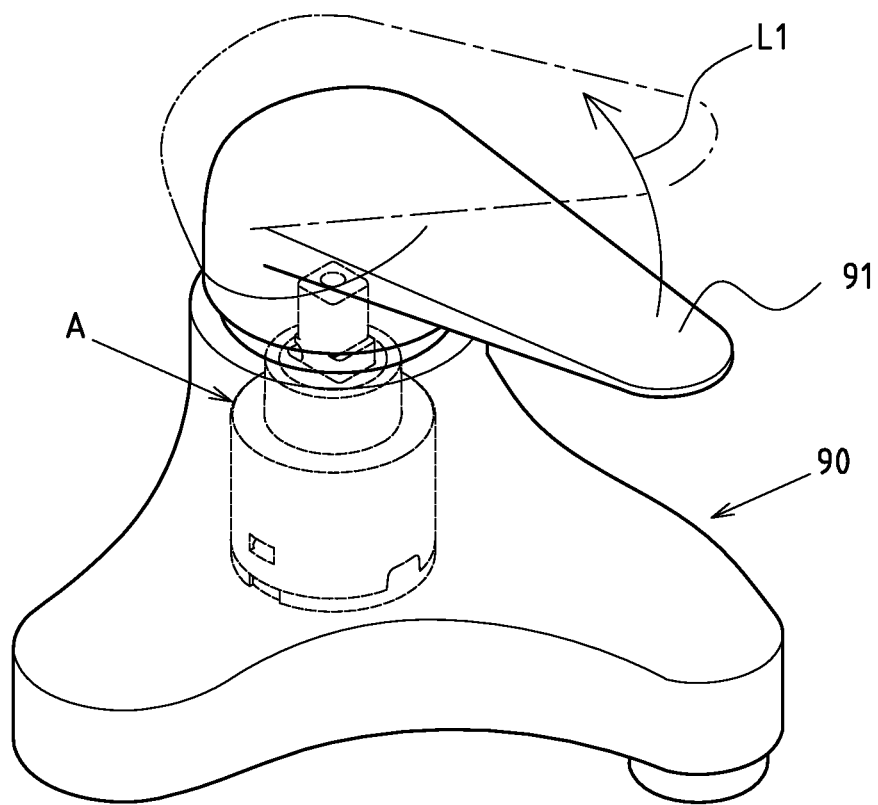
FIG. 6 is a status perspective view of the present invention wherein the handle of the dual-temperature faucet at the intermediate section is pulled up.
Figure 7:
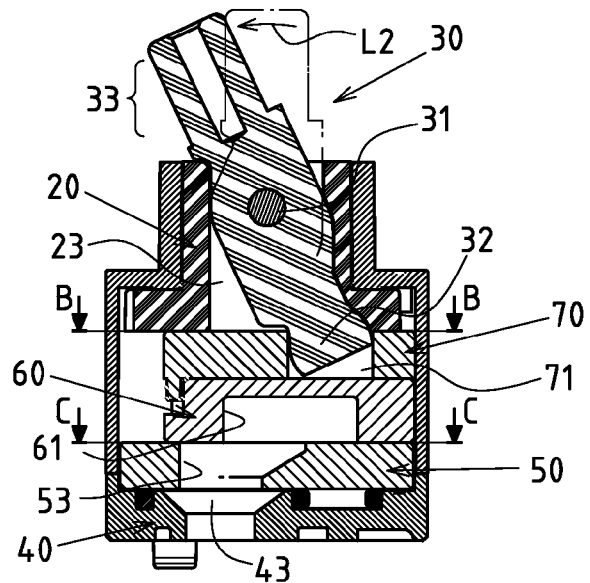
FIG. 7 is a vertical assembly sectional view of ceramic valve of the present invention when the braking valve rod swings to an oblique water supply mode from the preset intermediate section.
Figure 8:
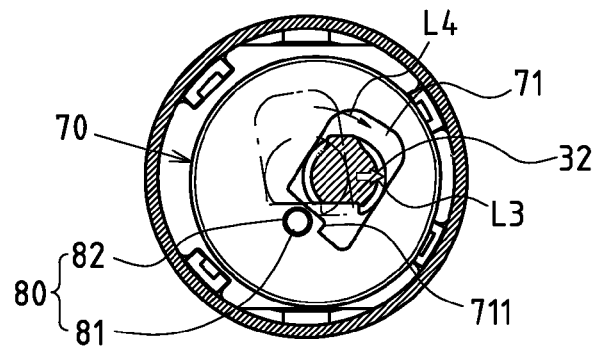
FIG. 8 shows a B-B sectional view of FIG. 7.
Figure 9:
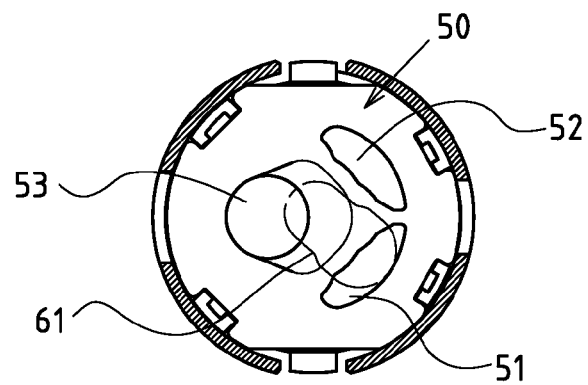
FIG. 9 shows a C-C sectional view of FIG. 7.
Figure 10:
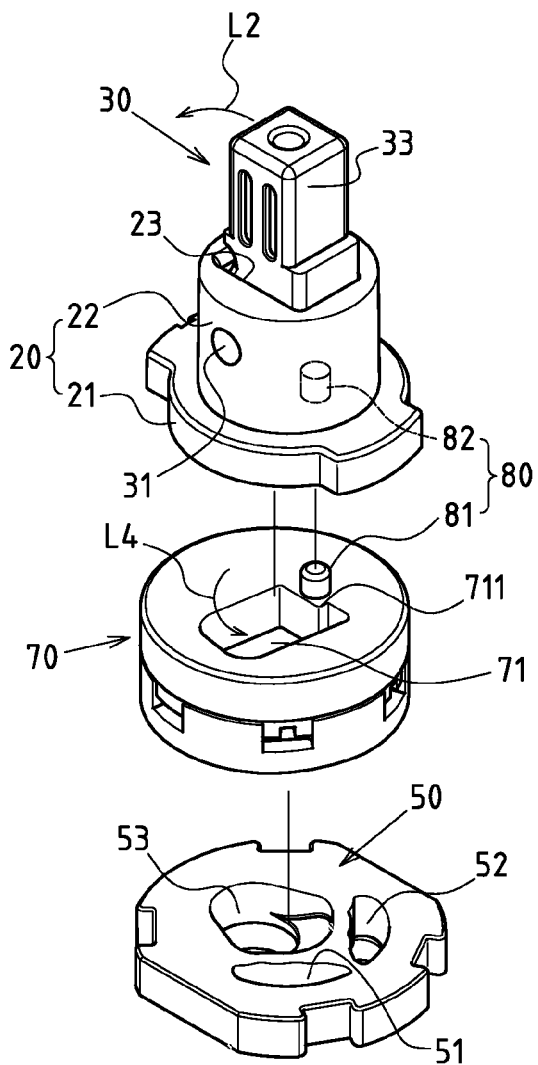
FIG. 10 is a top view of the present invention wherein the components are in an active state.
Figure 11:
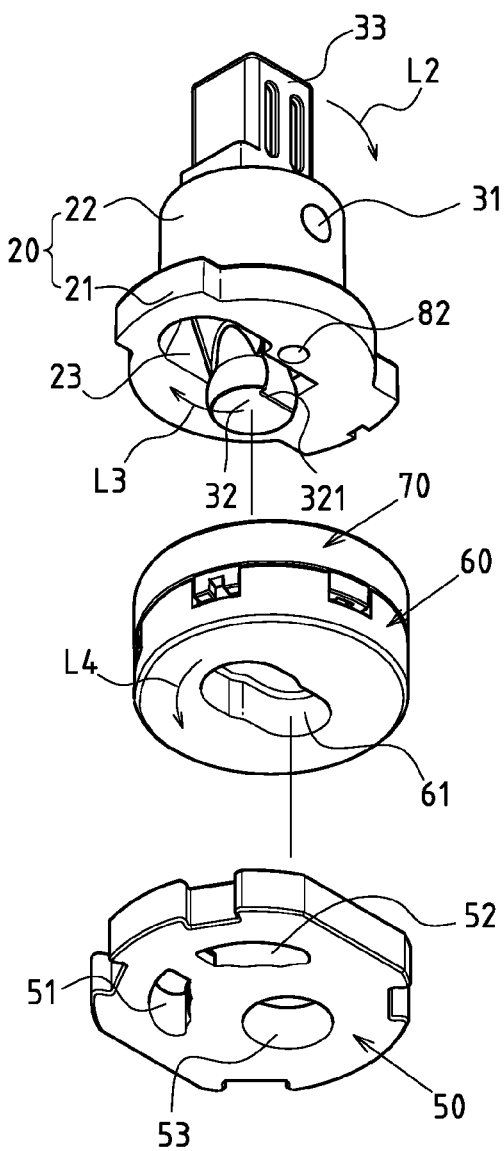
FIG. 11 is a bottom view of the present invention wherein the components are in an active state.

Based upon above-specified structural design, the ceramic valve of the present invention with intermediate section having cold water supply function is operated as follows:

Referring firstly to FIG. 3, when the braking valve rod 30 is located at the preset intermediate section in a vertical water-stop mode, the toggle end 32 is close to the center of the valve casing 10 (shown in FIG. 4). In such a case, the water flow control slot 61 set at bottom surface of the rotary valve block 60 is only connected correspondingly with the discharge through-hole 53 of the fixed valve block 50, and staggered from the cold water through-hole 51 and hot water through-hole 52 (shown in FIG. 5), showing a water-stop state of the ceramic valve A. Referring also to FIG. 6, the ceramic valve A is assembled in a dual-temperature faucet 90, wherein the "preset intermediate section" mentioned herein refers to the position of the central angle to which the handle 91 of dual-temperature faucet 90 swings. In such a case, when the user pulls the handle 91 up (indicated by arrow L1 of FIG. 6), the braking valve rod 30 of the ceramic valve A will swing to the oblique water supply mode as indicated by arrow L2 in FIGS. 7, 10, 11. Next, the toggle end 32 below the braking valve rod 30 will linearly toggle the driven slot 71 (indicated by arrow L3 in FIGS. 8, 11), then the coupling seat 70 along with the rotary valve block 60 may rotarily shift by taking the biased rotary support unit 80 as a rotary pivotal point (indicated by arrow IA in FIGS. 8, 10, 11), so the water flow control slot 61 is only connected with the cold water through-hole 51 in a cold water supply mode (indicated by FIG. 9). Hence, the ceramic valve A enables to supply only cold water by the intermediate section (note: the conventional ceramic valve A could supply warm water when the intermediate section is opened).

Figure 12:
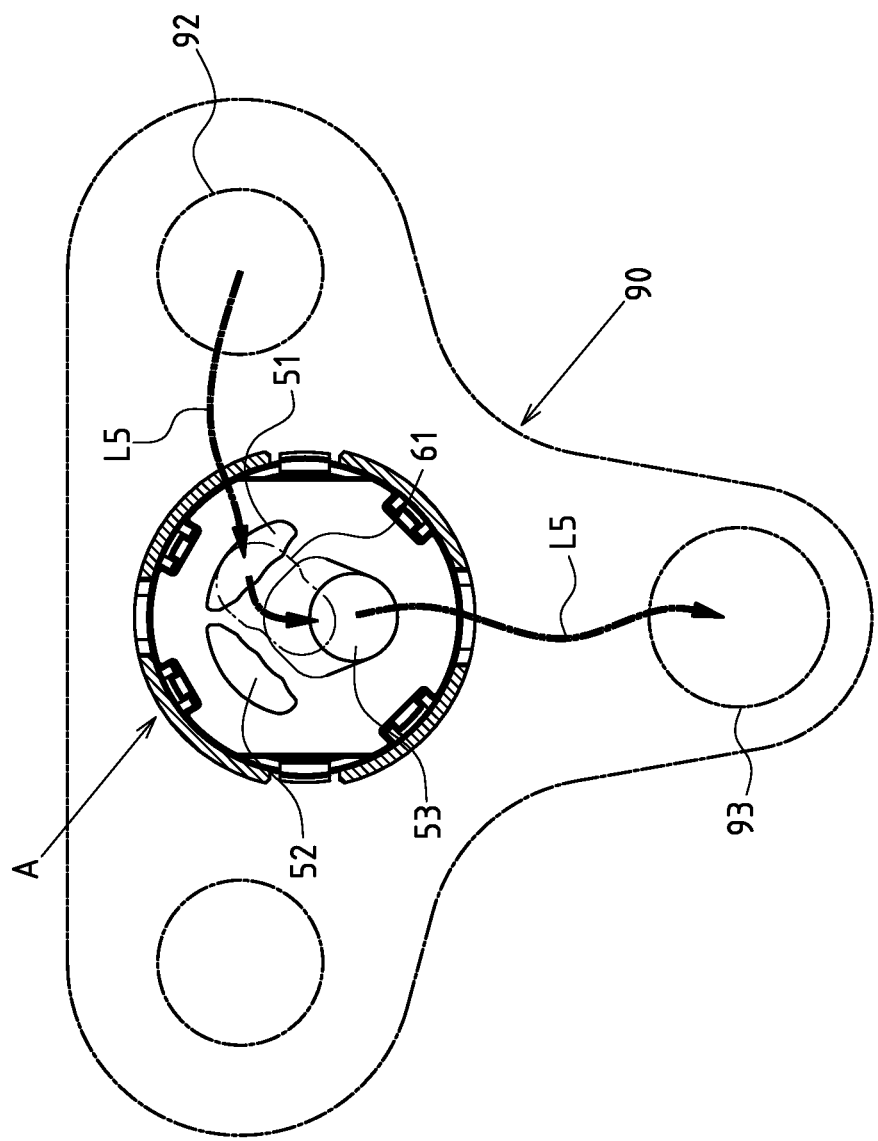
FIG. 12 is a plane view of the present invention showing cold water supply path at the intermediate section.

Referring also to FIG. 12, the flow path of said ceramic valve A with intermediate section only supplying cold water is further mated with the flow path of the dual-temperature faucet 90. If the ceramic valve A is in a cold water supply mode when the water flow control slot 61 is only connected with the cold water through-hole 51, the cold water inlet path 92 of the dual-temperature faucet 90 can be connected to the discharge outlet 93 (indicated by arrow L5).

I claim:

1. A ceramic valve with an intermediate section having cold water supply function, which comprising:

a valve casing with a hollow cylindrical shape, comprising of a top opening and a bottom opening; the top opening is provided with a reducing annular frame;

a rotary driving seat, comprising of an inner seating portion and a flanged tubing portion in a reducing pattern; of which, the inner seating portion is set adjacent to one end of the top opening within the valve casing, the flanged tubing portion is pivoted across the reducing annular frame of the valve casing in a rotatable state, and a through-type valve rod retaining hole is set at center of the rotary driving seat;

a braking valve rod, set into the valve rod retaining hole of the rotary driving seat via a rotary support in a vertically rotary state; a toggle end at lower end of the braking valve rod is protruded below the inner seating portion of the rotary driving seat, while a handle driving portion at upper end of the braking valve rod is protruded out of the flanged tubing portion of the rotary driving seat;

a pedestal, assembled securely into the bottom opening of the valve casing; said pedestal comprises of a cold water inlet, a hot water inlet and a water outlet in a triangular configuration pattern;

a fixed valve block, assembled securely onto the top surface of the pedestal, comprising of a cold water through-hole, a hot water through-hole and a discharge through-hole in a triangular configuration pattern, which are aligned and connected correspondingly with the cold water inlet, hot water inlet and water outlet of the pedestal;

a rotary valve block, superimposed on top surface of the fixed valve block in a rotary state; a recessed water flow control slot is set on the bottom surface of the rotary valve block; said water flow control slot could vary with the rotary shift of the rotary valve block, so that different channels are generated correspondingly in relation to the cold water through-hole, hot water through-hole and discharge through-hole of the fixed valve block;

a coupling seat, assembled securely on top surface of the rotary valve block in a coupled state;

a driven slot, recessed into an off-center position on top surface of the coupling seat; the toggle end at lower end of the braking valve rod is inserted into said driven slot, and there is an active clearance between the driven slot and toggle end;

a biased rotary support unit, comprising of a flanged axle and an axle hole that are sleeved together in a rotatable state; said flanged axle and axle hole are separately arranged at top surface of the coupling seat and an off-center position on bottom surface of the inner seating portion of the rotary driving seat; hence, a biased rotary support position is shaped between the rotary driving seat and coupling seat; when the braking valve rod swings to an oblique water supply mode from the preset intermediate section, the toggle end at lower end of the braking valve rod will linearly toggle the driven slot, then the coupling seat along with the rotary valve block may rotarily shift by taking the biased rotary support unit as a rotary pivotal point, so the water flow control slot is only connected with the cold water through-hole in a cold water supply mode.

2. The structure defined in claim 1, wherein an angular concave surface is set at one side of the toggle end below the braking valve rod, while an angular flange is set correspondingly to one side of the driven slot on top surface of the coupling seat, enabling interlocking with the angular concave surface.

* * * * *